UNITED STATES PATENT OFFICE.

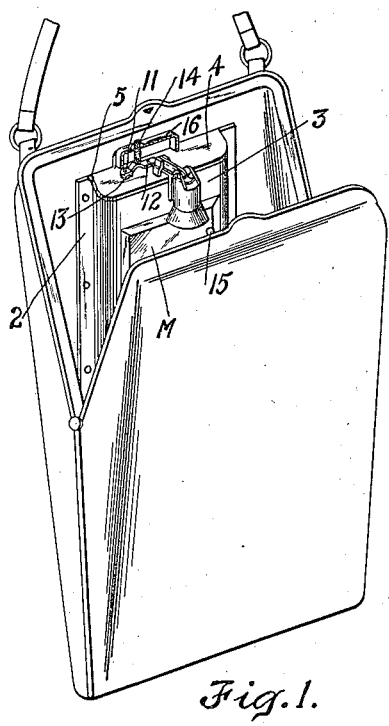

AUGUST SUNDH, OF HASTINGS-UPON-HUDSON, NEW YORK.

PORTABLE MIRROR.

1,184,146.

Specification of Letters Patent.

Patented May 23, 1916.

Application filed December 16, 1914. Serial No. 877,479.

*To all whom it may concern:*

Be it known that I, AUGUST SUNDH, a citizen of the United States, residing in Hastings-upon-Hudson, in the county of Westchester and State of New York, have invented a new and useful Improvement in Portable Mirrors, of which the following is a specification.

My invention relates to portable mirrors, and is designed to do away with the inconvenience and annoyance of not having sufficient light when using the mirror.

I have provided a portable mirror, combined with a battery and an electric lamp, so arranged as to be very compact; it may be folded up and carried in a hand bag, for instance, or the pocket; there is no danger of the light remaining on and thus wasting current, in case one should forget to turn it off; the light will always be in position where it will give the best results, and is always available. Take for instance the case of a person carrying my device in a hand bag, the mirror need not even be removed from the bag to be used. Then again in looking for articles in a traveling bag in some place where the light is poor my device will be found very useful, as it will only be necessary to switch on the light and the whole interior of the bag will be lighted up. In crowded dressing rooms, like on a railroad train, it often happens that all the mirrors are in use; with my arrangement one has a mirror and a light for the mirror right at his hand ready for use. For that matter, the device may be used as a mirror alone, a light alone, or the two together, at the will of the user.

In the drawings, in which like parts are indicated by like reference characters, I have shown three different applications of my invention, the arrangement of parts in all being more or less similar.

Figure 1 is a view showing, in perspective, my device incorporated in a hand bag; Fig. 2 is a side elevational view, partly in section, of the apparatus shown in Fig. 1; Fig. 3 is a front elevation showing my device applied to a different type of carrier, in which when opened the light is located at the side of the mirror instead of over the top; Fig. 4 is a plan view of the apparatus of Fig. 3; Fig. 5 is a side elevation of part of Fig. 3, showing the arrangement of contacts; Fig. 6 is a front elevational view, partly in section, showing my device embodied in a case which when not in use may be folded up with the lamp, mirror, etc., entirely inclosed; Fig. 7 is a side elevation of Fig. 6, with the apparatus in closed position; Fig. 8 is a side elevation of the apparatus with the parts opened.

Referring to the drawings in detail, in Fig. 1, is illustrated a handbag, 1, which may be of any of the well known types to the inside of which my apparatus is secured permanently. The apparatus may be secured to the handbag in any convenient way, but I have shown a plate, 2, of light metal, or any suitable material, which is riveted or otherwise securely fastened to the bag, 1. Formed on this plate is a casing or pocket, 3, having a cover, 4, hinged at 5. This casing is to hold the battery insulated therefrom which furnishes the power for the light. Secured to the front of the casing is a mirror, M. Formed integral with the cover, 4, and extending at right angles to the casing a short distance, out over and above the mirror, is an arm, 6, insulated from the cover 4 at I, Fig. 2, to which is pivotally secured a reflector, 7, pivoted at 8. This reflector is screw threaded to receive a lamp, 9. Leading from the bottom of the lamp is a contact strip, 10, which is substantially T-shaped, the leg extending down the front face of the casing, 3, and the end of the top most distant from the lamp being soldered to the cover, 4. The bracket, 6, being pivoted to the reflector, 7, is my other contact. Its inner end projects down through the cover and contacts with one lead of the battery. Pivoted in the cover, 4, by pin 11, is an arm, or switch arm, 12, the pin 11, being in contact with the other lead of the battery. Insulation, 13, insulates the switch arm 12, and pin, 11, from the cover of the casing. Mounted on the switch arm, 12, is a small handle, 14, made of rubber or any insulating material. The location of the switch arm 12, as will be seen from the drawing, is such that when the arm is swung by the handle, 14, toward the contact strip, 10, it engages it, establishing a circuit from the battery through the lamp and back to the battery, as follows: from one terminal of the battery, pin 11, arm 12, contact strip 10, through the filament of the lamp 9, reflector 7, bracket 6, to the other terminal of the battery. Formed on the side of the bag, opposite that to which the part, 2, is attached, I have shown a teat, 15. This teat is positioned so that when the bag is closed, it, the teat, will strike the handle, 14, and break the circuit through the lamp. The purpose of this arrangement is, that if for any reason a person using the apparatus should forget to throw the switch or lever 14, to extinguish the light, the light will be extinguished by the closure of the bag; and not only does the closing of the bag extinguish the light, but it maintains the circuit to the light broken until the bag is again opened, thus obviating any chance of the switch arm being thrown to closed position by a jar or other cause while the bag is closed. Mounted upon the cover, 4, near the back part thereof, is formed a shield 16, substantially rectangular in cross section, as viewed in Fig. 1. This shield is wide enough to cover the light and switch mechanism, and extends out from the cover and over the top of the reflector, 7. The purpose of this shield is merely to protect the lamp, as will be seen from Fig. 2. A slot, 17, is provided in the shield, near its inner end, through which the handle, 14, of the switch arm, 12, projects. A slot is provided also in the reflector, 7, through which the contact arm, 10, passes.

Figs. 3, 4 and 5, show another application of my invention. In this application, I have incorporated the apparatus in a metal casing, 19, which is hinged at, 20. The cover, as we will call it, 21, has attached to it a mirror, 22. Contained within the other part or body of the case is a battery to furnish power for the lamp. The lamp, which is carried by the body part of the casing, 19, is riveted to it by rivets, 24 and 25. A reflector, 26, is provided for the lamp, this reflector being screw threaded to receive a bulb, 23, as in Fig. 1, and insulated from the casing. A contact bar, 27, leads from the lamp, down to one lead of the battery, and is in constant engagement with both the lamp and the battery. A contact, 28, extends from the other lead of the battery, as shown in Fig. 3. A contact bar, 29, extends from the reflector, 26, as shown in the drawing until directly over the contact, 28. This bar has a downwardly extending portion, 30, in which is adapted to slide a bar, 31, this bar being of sufficient length when operated to contact with the contact, 28. Therefore, when it is desired to light the light, it is necessary only to push down the bar, 31, which will close the circuit from the battery through the lamp. With this arrangement, only, however, one might close the case, forgetting to operate the switch, 31, to extinguish the light. To avoid this, I have provided an arrangement clearly illustrated in Fig. 5. Mounted on the cover 21 is an arm, 32, adapted to engage the bar, 31, of the switch to lift the bar out of engagement with the contact, 28, when the cover is in closed position. 33 indicates the ordinary catch for holding the case, 19, closed when not in use.

In Figs. 6, 7 and 8, I have illustrated another form of my invention. In this form, I have shown a mirror with light attached, which may be folded up into compact form so as to be carried in the pocket, for instance, but which at the same time, when opened out, may be set up for use on a table or any other place where there may be room for it, and will stand up of its own accord. This arrangement consists of a back, 34, which is made of some stiff material, say a light weight wood, covered with leather. Carried by this back is a pocket or case, 35, which may be made of leather also, to hold the battery which is to furnish the power for the light. Secured to the back, 34, at the top thereof, is an L-shaped piece, one leg of which extends down the back and into engagement with one lead of the battery. Pivotally mounted on the end of the other arm is a reflector, 37. This reflector is screw threaded to receive the lamp, 38. Extending from and in contact with the top of the lamp is a contact strip, 39, substantially L-shaped, one leg running down the front of the back into engagement with a strip, 40, extending transversely of the back. This strip at its outer end carries a T-shaped piece, 41, adapted to reciprocate in a groove in the part, 40. The leg of this piece, 41, is arranged to engage the other lead, 42, of the battery when operated. When the part, 41, is moved to the left, Fig. 6, to engage the contact, 42, a circuit is established from the battery through the lamp. Hinged at 43', to the bottom of the part, 34, is a short piece of suitable material, 43, of a depth slightly greater than the thickness of the casing, 35, and extending transversely of the part 34, for the entire width of the latter. Hinged to this part, 43, at 44', is another piece, 44, of some suitable stiff material, such has a light weight wood covered with leather. The width of this piece is the same as that of parts 44 and 34, but its depth is practically that of the length of the back 34. Attached to the back, 34, by a flexible strip, 45, is a mirror, 46. The mirror is adapted to lie flat against the battery casing, 35, when the apparatus is closed up, and the length of it should be such that when folded up there will be a slight clearance between the bottom of it and the part, 43, and the top of it and the lamp, 38, when the latter is swung about its pivot into folded up position. Attached to the end of the part, 44, most distant from the hinge, 44', is a strip, 47, of some flexible material. This strip extends transversely of the part 44, and is secured thereto in any suitable way. I have shown it riveted at 48. This strip is made long enough to overlap the top of the lamp reflector, 37, and contact arm, 36, and extend down the part, 34, a short distance, being secured thereto when the apparatus is not in use, by a snap, 49, or in any other way, so long as it may be detached therefrom quickly.

The lamps of my apparatus in all three embodiments herein illustrated, should be made of frosted glass, or the rays of light from the lamps be softened in some way, as I have found from experiment that in using plain glass the reflection in the mirror is rather stronger than should be for a practical arrangement.

It is to be noted that all of the lamps are pivoted, excepting in the case of the device of Fig. 3, so that they may be adjusted at any angle to suit the will of the person using the mirror.

I desire not to be limited to the precise construction and arrangements of parts as herein set forth, as any one skilled in the art could make various changes therein without departing from the spirit and scope of the invention.

What I claim as new, and desire to have protected by Letters Patent of the United States is:—

1. A portable mirror, a portable electric lamp to light said mirror, an electric battery, a circuit between the lamp and battery, means operative at will to make and break the circuit, an inclosure comprising a hand bag to inclose the mirror, light, battery, circuit and means to break the circuit, and means operated by the closing of the hand bag to break the circuit.

2. The combination of a portable electric lamp, a portable mirror, a portable electric battery for the lamp, a reflector for the light, the light and reflector being adjustable relatively to the mirror, and means to support the lamp, mirror, reflector and battery as one unit, and an inclosure comprising a hand bag to which said supporting means is secured.

3. The combination of a hand bag, a pocket secured to the inside of the bag, a mirror secured to said pocket, an adjustable lamp mounted on the pocket to throw its rays on the mirror, an electric battery carried in said pocket to furnish power for said lamp, connections between said lamp and battery, and means in said connections to make and break the circuit to said lamp at will.

4. The combination of a hand bag, a pocket secured to the inside of the bag, a mirror secured to said pocket, an adjustable lamp mounted on the pocket to throw its rays on the mirror, an electric battery carried in said pocket to furnish power for said lamp, connections between said lamp and battery, means in said connections to make and break the circuit to said lamp at will, and means mounted on and carried by the said pocket to protect the said connections between the battery and lamp from interference by articles carried in the bag.

5. The combination of a hand bag, a pocket secured to the inside of the bag, a mirror secured to said pocket, an adjustable lamp mounted on the pocket to throw its rays on the mirror, an electric battery carried in said pocket to furnish power for said lamp, connections between said lamp and battery, means in said connections to make and break the circuit to said lamp at will, and means carried by the said pocket and overhanging the lamp and connections to protect the same from interference by articles carried in the bag.

6. The combination of a hand bag, a pocket secured to the inside of the bag, a mirror secured to said pocket, an adjustable lamp mounted on the pocket to throw its rays on the mirror, an electric battery carried in said pocket to furnish power for said lamp, a reflector for said lamp attached to said lamp, connections between said lamp and battery, means in said connections to make and break the circuit to said lamp at will, means carried by the said pocket and overhanging the lamp and reflector and connections to protect and overhanging the lamp and reflector and connections to protect the same from interference by articles carried in the bag, and means carried by the inside of the bag to break the circuit to the lamp when the bag is closed.

7. The combination of a hand bag, a support secured to the inside of the bag, a mirror secured to said support, an adjustable lamp also secured to said support and mounted to throw its rays on the mirror, an electric battery carried on said support and furnishing power for said lamp, connections between said lamp and battery, and means in said connections to make and break the circuit to the said lamp at will.

In testimony whereof, I have signed my name to this specification in the presence of two subscribing witnesses.

AUGUST SUNDH.

Witnesses:
WALTER C. STRANG,
JAMES G. BETHELL.